CAN OPENER

Original Filed Sept. 22, 1961 4 Sheets-Sheet 1

INVENTOR.
Clarence J. Smith
BY
Olson, Trexler
Wolters & Bushnell Attys

CAN OPENER

Original Filed Sept. 22, 1961 4 Sheets-Sheet 2

INVENTOR.
Clarence J. Smith
BY Olson, Trexler
Wolters & Bushnell
Attys.

CAN OPENER

Original Filed Sept. 22, 1961 4 Sheets-Sheet 3

INVENTOR.
Clarence J. Smith
BY
Olson, Trexler
Wolters & Bushnell
Attys.

CAN OPENER

Original Filed Sept. 22, 1961 4 Sheets-Sheet 4

INVENTOR.
Clarence J. Smith
BY Olson, Trexler
Wolters & Bushnell
Attys.

United States Patent Office

Re. 27,504
Reissued Oct. 10, 1972

27,504
CAN OPENER

Clarence J. Smith, 901 Birch Road, Apt. B-3,
Fort Lauderdale, Fla.

Original No. 3,094,776, dated June 25, 1963, Ser. No. 139,972, Sept. 22, 1961. Application for reissue Apr. 9, 1970, Ser. No. 31,433
Int. Cl. B67b *7/32, 7/38*
U.S. Cl. 30—15.5 28 Claims

Matter enclosed in heavy brackets [ ] appears in the original patent but forms no part of this reissue specification; matter printed in italics indicates the additions made by reissue.

*ABSTRACT OF THE DISCLOSURE*

*The structure herein described comprises a can opener for opening the end seam of a metal can by cutting through the outer wall of the cover hook in a radially inward direction from the outer side of the end seam. The structure comprises a rotary cutter engageable with the outer wall of the end seam and a cooperative back-up roll engageable with the inner wall of the end seam to clamp the end seam therebetween. There is further provided an elongated handle to hold the opener and a rotatable turning knob for positively moving the cutter and back-up roll relatively toward each other and for traversing the cutter peripherally of the end seam to effect the cutting operation. Guide means engageable with the axial outer edge of the end seam is provided for guiding the cutter at an appropriate dive angle in its traverse movement; and there is further provided a guide roller engageable with the side wall of the can, further to orient and position the cutter in its cutting action.*

The present invention relates to a can opener for opening "tin cans" which are designed to be opened individually by cutting through a cover hook folded around a body hook in an axially projecting end seam which secures a cover to a body of a typical can.

The opening of containers or "tin cans" by cutting through cover hooks of individual containers in the manner recited affords many advantages not obtained when such containers are opened by severing container covers circumferentially along the junctures of the generally flat central portions of the covers with the end seams by which the covers are attached to the container bodies.

One object is to provide, for opening cans in which covers are secured to can bodies by axially projecting end seams, a new and improved can opener which affords many advantages in opening individual cans by circumferentially severing adjacent the axially outer edge of a typical end seam a cover hook which overlies a body hook within the end seam.

Another object is to provide a can opener of the character recited which, by virture of new and advantageous operating characteristics achieved through a novel construction of the opener, will seek and maintain an optimum cover hook severing position in relation to a cover hook in a can end seam simply as an incident to operation of the opener to open a can.

Another object is to provide an improved can opener of the character recited which operates with great ease and efficiency to effect certain and highly advantageous opening of cans of the character described by cutting through cover hooks of the cans.

Another object is to provide a can opener of the above character which effects, as an incident to use of the opener to open a can, location of a floating cutter in an optimum cover hook cutting position in relation to the end seam of a can in a manner which compensates automatically for dimensional variations in the end seams of different cans.

Another object is to achieve the functional aspects of the preceding objects by means of an improved can opener which by virture of a novel and inherently sturdy construction is capable of maintaining its inherent operating efficiency over a long life of rugged service.

Another object is to provide an improved can opener of the character recited which is inherently economical to manufacture.

Other objects will appear from the following description of the exemplary embodiment of the invention illustrated in the drawings, in which.

Figure 1:
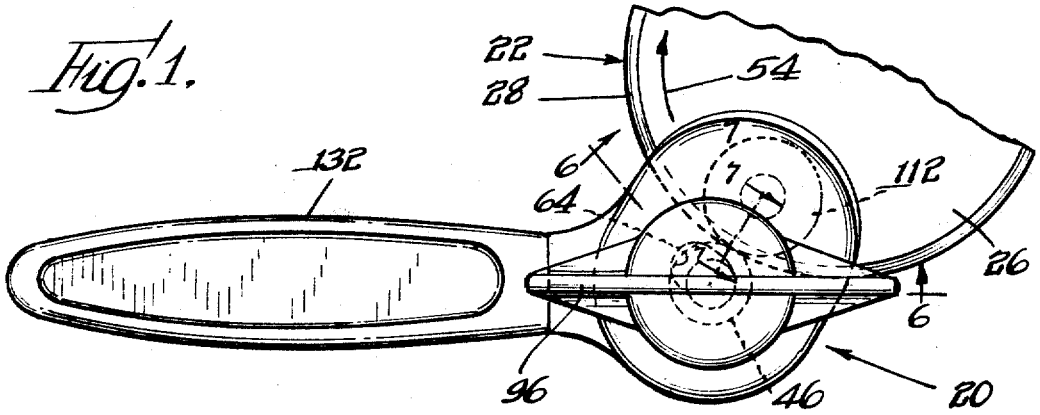
FIGURE 1 is a plan view showing a can opener constructed in accordance with the invention and initially applied to a can to be opened.

The can opener forming the exemplary embodiment of the invention illustrated is identified in the drawings by the number 20. The illustrated container or can 22 is adapted to be opened by the opener 20 and comprises a body 24 closed at each end by a cover 26 secured to the body 24 by an axially projecting annular end seam 28, FIGS. 1, 2, 5, 7 and 8.

Figure 7:
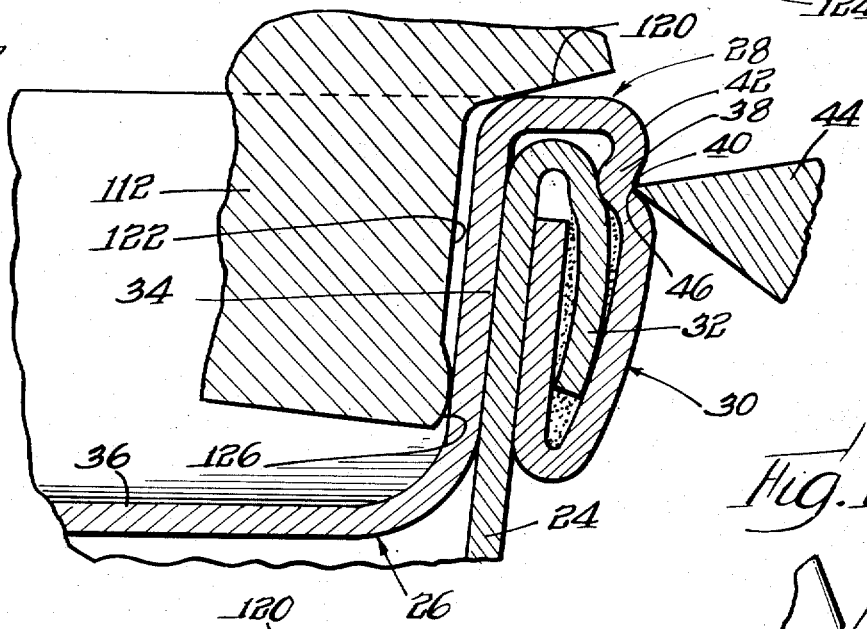
FIG. 7 is a simplified transverse sectional view of the opener and can taken with reference to the line 7—7 of FIG. 1.

The end seam 28 comprises a cover hook 30, FIG. 7, folded around a body hook 32 on the body 24 and connected to an axially extending chuck wall 34 integrally joined to a generally flat central portion 36 of the cover 26 and fitting into the adjacent end of the body 24 to define the radially inward face of the end seam. The cover hook 30 includes an annular cover hook guiding segment 38 encircling the body hook 32 adjacent the axially outer extremity of the body hook. The cutter guiding segment 38 of the cover hook is reversely curved in transverse section to define a circumferential groove 40 opening radially outward and being bounded on the axially outward side of the groove by a radially projecting circumferential protuberance 42 substantially flush with the axially outward extremity of the end seam 28 and being limited radially so as not to protrude radially beyond the portion of the cover hook 30 disposed axially inward of the groove.

The can 22 is opened to advantage by cutting through the cutter guiding segment 38 of the cover hook 30 in one end seam 28. Upon severing of a cover hook 30 circumferentially through the cutter guiding segment 38 of the hook, the associated cover is removed from the can body, the chuck wall 34 and a radially extending portion of the severed cover hook remaining attached to the central portion 36 of the removed cover.

A can adapted to be opened in the manner described provides many advantages, including the capability of the removed cover of being used as a lid to reclose the can.

The opener 20 provided by the invention for opening a can 22 of the character described comprises a rotary circular cutter 44 defining a circular cutting edge 46, FIGS. 1 to 8. As will appear, the opener 20 is designed to produce, as an incident to application of the opener to a can and turning of a rotary actuator for the opener, an automatic location of the circular cutting edge 46 in an optimum cutting position in relation to the adjacent end seam of the can.

Thus, as illustrated in the drawings, the cutter 44 is positioned in relation to a can 22 to be opened so that the axis 48 of the cutter has an askew relationship to the central axis of the can and to adjacent portions of the can body 24 and end seam 28, which relationship causes the cutter upon rotation to seek a most advantageous cover hook severing position in relation to the can end seam.

For simplicity in description, the opener 20 will be described with reference to the position occupied by the opener in opening the upper end of a can, as illustrated in the drawings.

Figure 3:
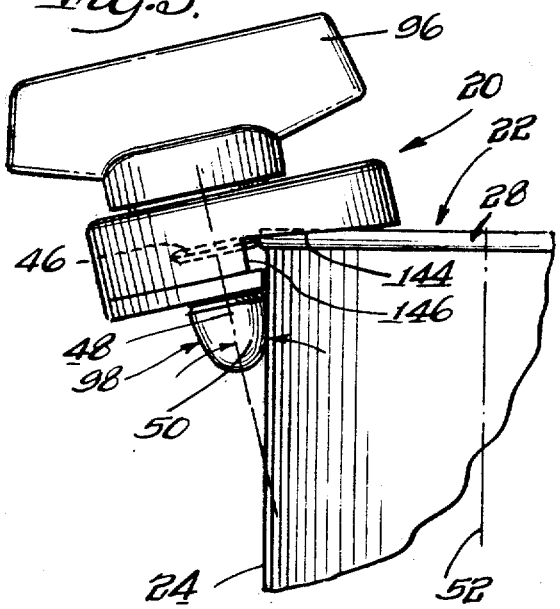
FIG. 3 is a simplified end view of the opener taken with reference to the right-hand end of FIG. 2.
Figure 4:
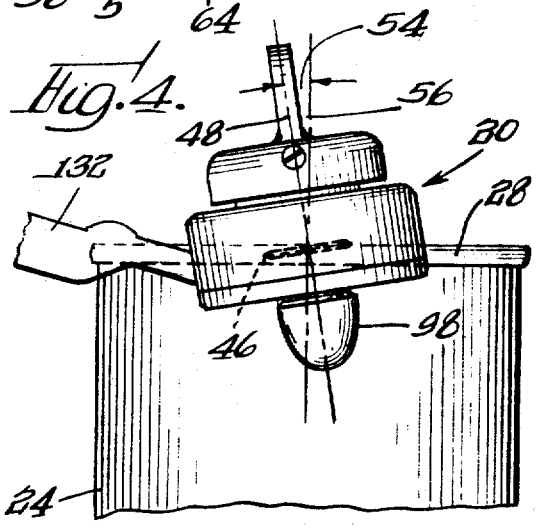
FIG. 4 is a fragmentary front elevational view of the opener as shown in FIG. 2.
Figure 5:
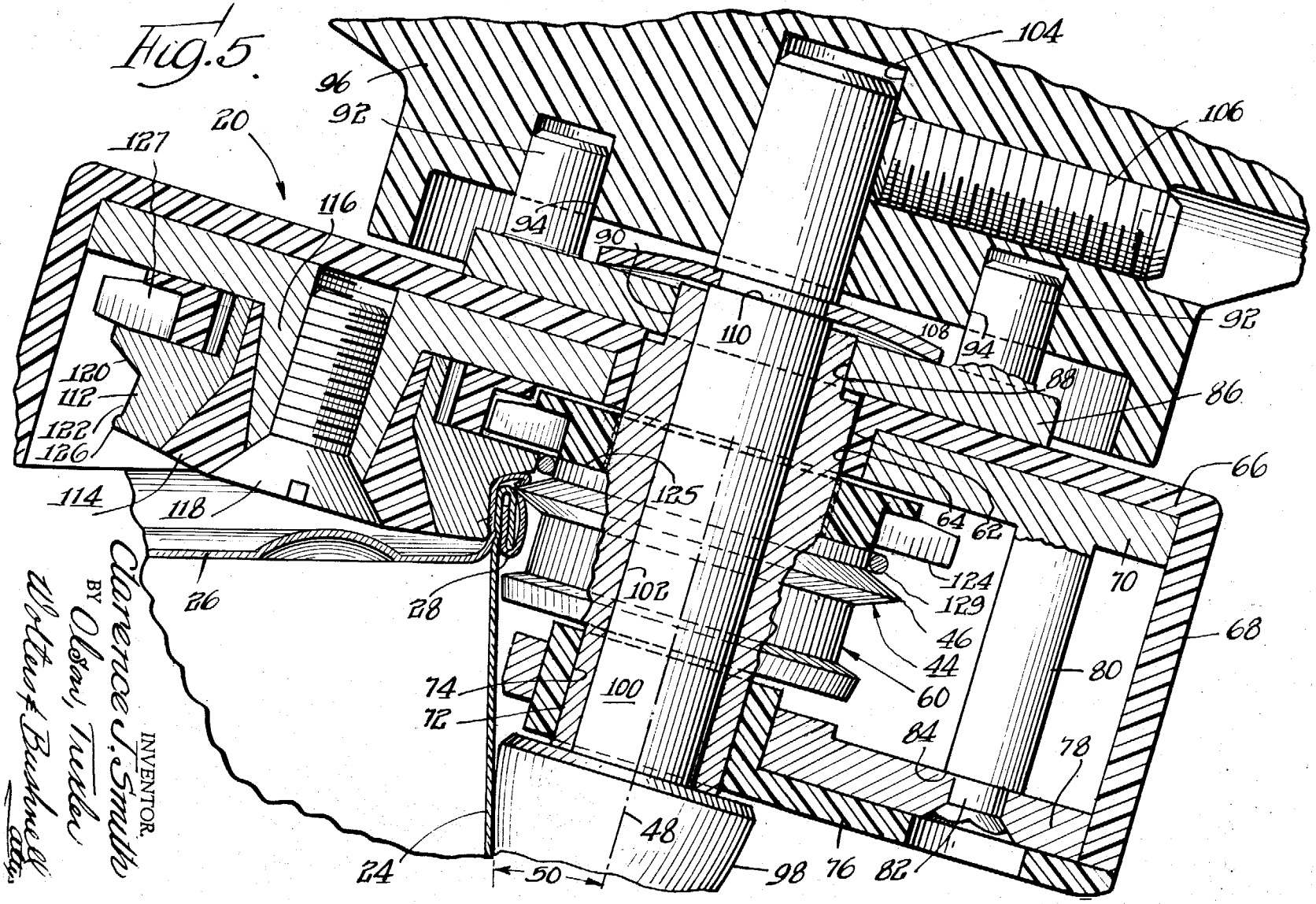
FIG. 5 is a transverse sectional view of the opener on a greatly enlarged scale taken with reference to line 5—5 of FIG. 2.
Figure 6:
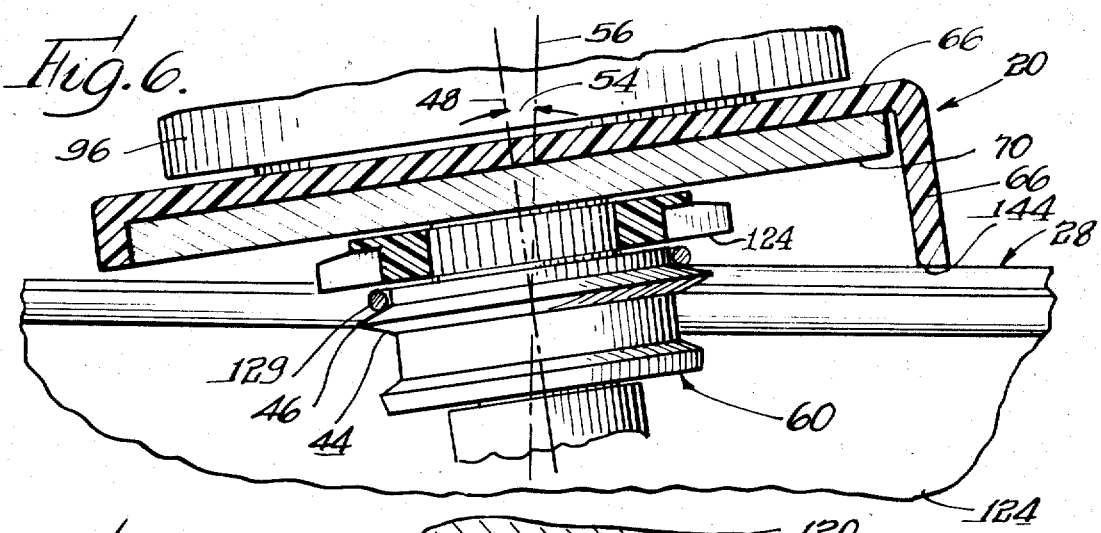
FIG. 6 is a simplified fragmentary sectional view taken with reference to the arcuate line 6—6 in FIG. 1.

The askew relationship of the cutter to the container being opened can be visualized and described by two angular relationships, one of which is illustrated in FIGS. 3 and 5 and the other of which is illustrated in FIGS. 4 and 6. As illustrated in FIGS. 3 and 5, the axis 48 of the cutter is tipped or canted so as to be inclined outwardly and upwardly at an angle 50 in relation to the adjacent portion of the container body 24. This angle can be more precisely defined as the angle which the cutter axis 48 makes with reference to a plant tangent to the most nearly adjacent portion of the container body 24. For cylindrical containers, the angle 50 is the angle, measured in a plane of reference containing the axis 52 of the container and extending through the center of the circular cutting edge 46, which the cutter axis 48 makes with reference to the container axis 52.

To open a container, the opener 20 is moved around the container in a clockwise direction, as indicated by the arrow 54 in FIG. 1. As illustrated in FIGS. 4 and 6, the axis 48 of the cutter edge 46 is tipped forwardly and downwardly at an angle 54 in the direction in which the opener moves around a container. This angle 54 will be referred to as an "angle of dive" 54 and can be defined more specifically as the angle which the cutter axis 48 makes with reference to a plane 56 extending through the center of the cutter edge circle in perpendicular relation to the adjacent portion of the end seam 28.

A highly advantageous cover hook cutting action of the cutter 44 is obtained by constructing the opener so that the angle of inclination 50, FIGS. 3 and 5, of the cutter axis is of the order of fifteen degrees, and the angle of the dive 54 of the cutter axis, FIGS. 4 and 6, is of the order of six to eight degrees.

Moreover, as will presently appear, the cutter 44 is floatingly mounted for limited axial movement into an optimum cover hook cutting position which it seeks by virtue of its mounting and its previously described askew relationship to a can being opened.

The cutter 44 is formed, as shown in FIG. 5, on a medial portion of a centrally bored metal rotor 60. A journal 62 formed on the rotor 60 above the cutter 44 fits rotatably within a kidney shaped bearing 64, FIGS. 1, 2 and 9, on a generally flat upper support 66 which is reinforced by a downwardly extending peripheral flange 68. The support 66 and the flange 68 are molded from a strong plastics material, preferably a plastics material sold commercially under the trade name "Delrin."

The support 66 and bearing 64 are reinforced by a die cast metal plate 70 disposed flat against the underside of the support 66, as shown in FIG. 5.

A second journal 72 formed on the rotor 60 below the cutter 44 fits rotatably within a kidney shaped bearing 74 similar to the bearing 64. The bearing 74 is formed integrally with a lower support plate 76 from a suitable plastics material, preferably "Delrin." The lower support 76 and bearing 74 are both supported by a lower die cast metal plate 78 rigidly secured to the upper plate 70 by a plurality of spacer elements 80 integral with the plate 70 and extending downwardly into abutting relation to the plate 78. As shown, extensions 82 on the spacers 80 (only one of which is shown in FIG. 5) extend into openings in the plate 78 where the extensions are enlarged by swaging to hold the plate 78 against abutments 84 on the spacers.

In this manner, the two bearings 64 and 74 are strongly supported in alinement with each other to provide unyielding radial support to the journals 62 and 72 above and below the cutter 44 to assure maintenance of the cutter in an optimum positional relationship to other coacting parts of the opener which is not disturbed by strenuous usage of the cutter over a long service life.

The rotor 60 is driven rotatably by means of a cam plate 86 defining a non-circular aperture 88, FIG. 5, which receives a flatted driving portion 90 of the rotor which extends above the journal 62. Cylindrical driving studs 92 integrally formed on the cam plate 86 project upwardly into apertures 94 in a winged hand grip 96 designed to be conveniently grasped by the user's hand to rotate the rotor 60.

A container body engaging roller 98 is supported immediately below the lower end of the rotor 60 by a cylindrical stem 100 on the roller which extends upwardly through a central bore 102 in the rotor into a bore 104 in the lower central portion of the hand grip 96, as shown in FIG. 5. A set screw 106 in the hand grip or handle 96 engages the stem 100 to hold the hand grip 96 in place. The upper end of the roller 98 itself abuts against the lower end of the rotor 60, as shown.

As shown in FIG. 5, clearance is provided between components rotatable with the rotor 60 and adjacent parts where necessary to provide freedom for the rotor 60 to "float" or move through a limited range of movement parallel to the axis of the rotor. The rotor 60 is urged upwardly or outwardly along its axis to a normal position by means of a dished, C-shaped spring washer 108 engaging an annular recess 110 in the stem 100 and reacting on the upper face of the cam plate 86 to act through the stem 100 and roller 98 on the rotor 60.

The roller 98 is spaced and positioned in relation to the cutter edge 46 to provide the desired fifteen degree angle of inclination 50 of the cutter axis 48 away from the container body 24. For this purpose, the roller 98 has the general form of a truncated cone having an apex angle of the order of thirty degrees and is modified to have a somewhat convex form as viewed from one side, FIGS. 3 and 5. The roller 98 is dimensioned diametrically and positioned axially relative to the cutter edge 46, so that the edge 46 stops radially short of the projected conical form the roller, whereby the desired fifteen degree angle of inclination is obtained when the edge 46 engages an end seam 28 and the roller 98 engages the can body 24 below the end seam, as shown in FIG. 5.

The cutter 44 is opposed by a platen roller 112 adapted to engage the inner face of an end seam 28 engaged by the cutter edge 46. The roller 112 is journalled on a plastic bearing 114 supported on an internally threaded boss 116, which extends downwardly from the plate 70 and receives a screw 118 which engages the bearing 114 to hold the latter in place. As shown, the lower end of the bearing 114 has a conical shape which interfits with the roller 112 to hold the latter in place.

The axis of the roller 112 is parallel to the axis of the cutter 44. A radial flange 120 on the roller 112 is adapted to fit over the axially outer edge of a container end seam 28 intervening between the cutter 44 and a conical platen surface 122 formed on the roller 112 to engage the radially inner face of the end seam, as shown in FIG. 5.

Rotary motion of the rotor 60 is transmitted to the roller 112 by a gear 124 non-rotatably fixed by knurling or otherwise to the rotor 60 between a rotor shoulder 125 and the plate 70, as shown in FIG. 5, and meshing with a gear 127 non-rotatably mounted on the roller 112.

As shown, the upper end of the gear 124, FIGS. 5 and 6 which is formed from a suitable plastics material, preferably "Delrin," is designed to slidably abut against the underside of the plate 70 and limit upward movement of the rotor 60 by the spring 108 to determine the normal position of the rotor. The gear 124 extends across a portion of the roller 112 and is dimensioned axially to allow the desired axial floating movement of the rotor.

Figure 8:
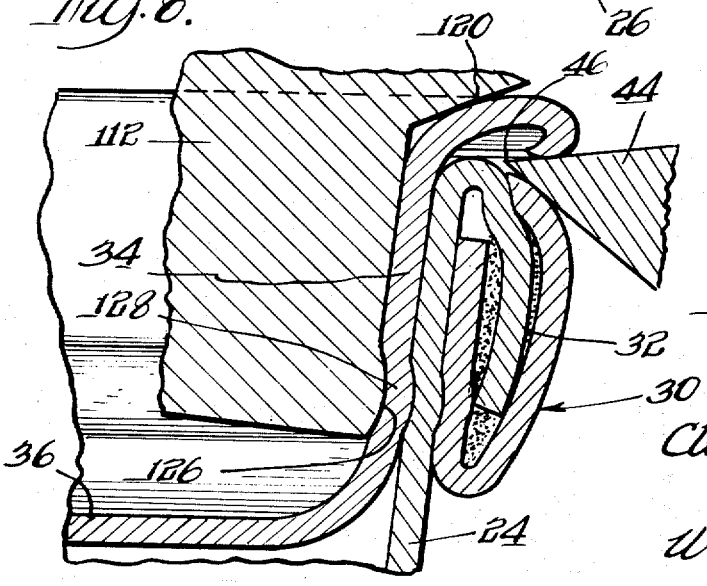
FIG. 8 is a view similar to FIG. 7 but showing the cutter moved inwardly to cut through the cover hook.
Figure 12:
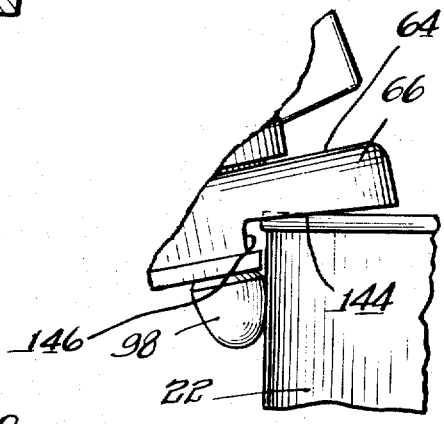
FIG. 12 is a fragmentary sectional view taken with reference to the line 12—12 of FIG. 2.

A small annular protuberance 126 formed on the roller 112 at the lower edge of the conical surface 122 is adapted to fit against the chuck wall 34 of a can end seam, as shown in FIG. 7, and effects an outward swaging of an adjacent annular portion 128 of the end seam of the chuck wall, as shown in FIG. 8, as an incident to use of the opener to open a can, as will be described.

Figure 2:
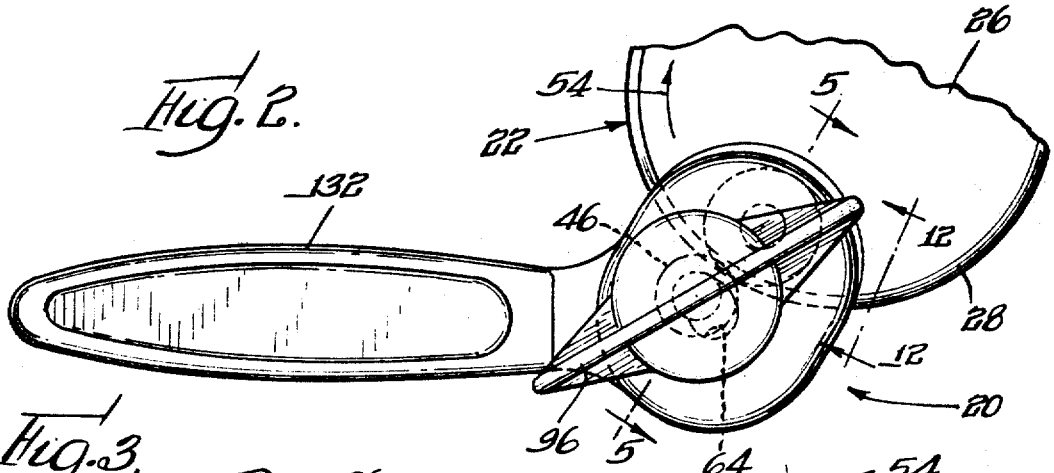
FIG. 2 is a fragmentary plan view similar to FIG. 1 but illustrating the opener after being operated to initially cut through a cover hook of the can.
Figure 9:
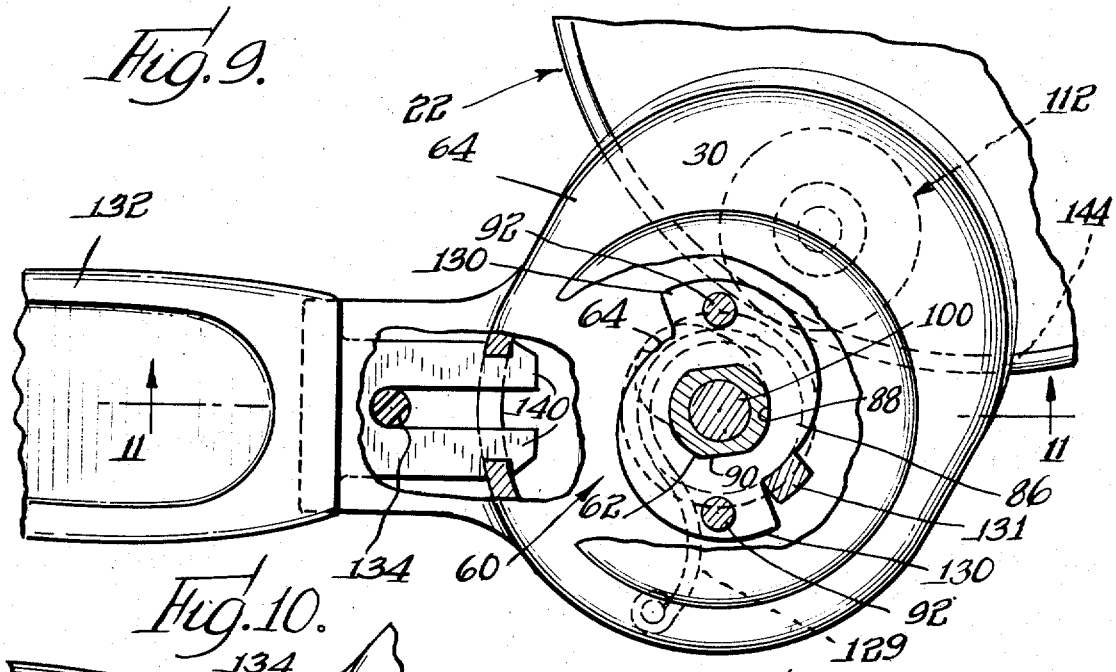
FIG. 9 is a fragmentary plan view of the opener and can with certain parts broken away to reveal underlying structure.

The upper kidney shaped bearing slot 64, FIGS. 2 and 9, and the lower kidney shaped slot 74 are spaced from the axis of the roller 112 and oriented so that the spacing of these slots from the axis of the roller 112 decreases in the direction in which the opener moves with respect to a container. Normally, the rotor 60 is urged toward the trailing ends of the slots 64, 74 by a spring 129, FIGS. 5 and 9, anchored to the support 66 and engaging the rotor above the cutter edge 46, FIG. 5.

Upon rotation of the hand grip 96 in the clockwise direction with reference to FIG. 9 to open a can, one of two lobes 130 on the cam plate 86 engages an abutment 131 on the support 66 to force the rotor 60 into the leading ends of the slots 64, 74 and toward the roller 112.

Figure 10:
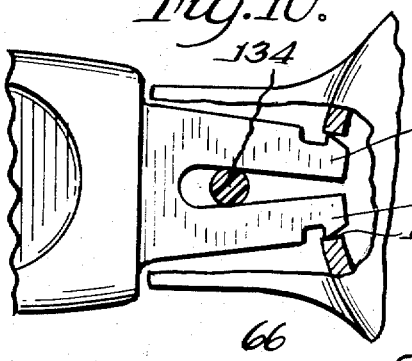
FIG. 10 is a fragmentary view similar to the lower left-hand portion of FIG. 9 and illustrating assembly of the opener handle.
Figure 11:
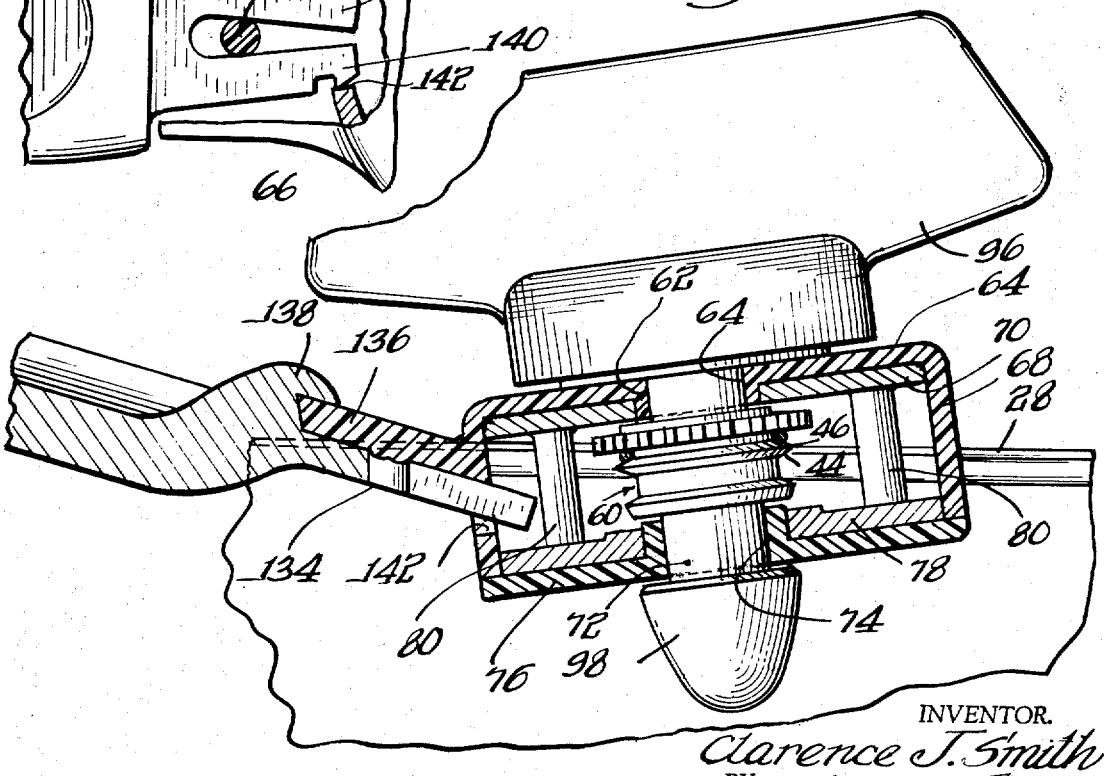
FIG. 11 is a sectional view taken along the line 11—11 of FIG. 9.

Preferably, the opener is manufactured and sold with a detached plastics handle 132 which is mounted on the support 66 by the user. As shown in FIGS. 9 to 11, the inner end of the handle 132 is bifurcated to slide inwardly in straddling relation to a lug 134 projecting downwardly from the underside of a handle mount 136 integral with and projecting outwardly from one side of the flange 68 on the support 66. A lip 138 on the handle 132 fits over the projecting end of the support 136 and two notched ears 140 on the inner end of the handle swing together, as shown in FIG. 10, to pass through an aperture 142 in the support flange 68 and then spring apart to lock the handle on the support.

To open a cam 22, the user places the opener in overlying relation to the cam as shown in the drawings to position the roller 112 and the cutter 44 in embracing relation to the upper end seam 28 of the can. The initial spacing of the cutter 44 from the roller 112, due to the rotor 60 being located in the trailing ends of the slots 64, 74, is sufficient to provide for ready reception of an end seam 28 between the cutter and roller. The roller flange 120 rests on the upper edge of the end seam 28.

The desired six to eight degree angle of dive 54 of the cutter axis 48, FIGS. 4 and 6, is produced upon placement of the opener on a container by engagement with the upper edge of the upper end seam 28 of a skid or rider 144 formed on the support flange 68, FIGS. 3, 6, 9 and 12. Preferably, the rider or skid 144 is formed by a section of the lower edge of the support flange 68 which overlies a portion of the end seam 28 disposed, with respect to the direction of movement of the opener, in trailing relation to the portion of the end seam engaged by the roller flange 120. The portion of the support flange 68 which overlies a container 22 is notched or relieved, as indicated by the number 146 in FIGS. 3 and 12, to provide clearance for reception of the container.

As shown in FIG. 6, the skid 144 is located on the flange 68 to occupy a position below the plane of the cutter edge 46. Moreover, the skid 144 is located, with respect to the axis of the roller 112, axially below the roller flange 120, which also engages the upper edge of the seam 28. The positional relationship of the skid 144 to the roller flange 120 and to the cutter edge 46 is such that when the skid 144 and flange 120 are engaged with an end seam 28 and the cutter edge 46 engages the cutter guiding segment 38 of the cover hook below the upper extremity of the end seam, as shown in FIGS. 7 and 8, the axis 48 of the cutter is tipped forwardly and downwardly to have the desired six to eight degree angle of dive.

The position of the cutter edge 46 in relation to an end seam 28 when the opener is placed on a can is illustrated in FIG. 7. Initial clockwise rotation of the hand grip 96 causes the cam plate 86 to move the cutter radially inward to cut through the cover hook 30, as shown in FIG. 8. Continued clockwise rotation of the hand grip 96 and rotor 60 holds the rotor in the leading end of the slots 64, 74 and progresses the opener around the cam to sever the cover hook 30 for opening the can, as described.

Before the opener is applied to a can, the gear 124 abuts against the plate 70 to determine the normal position of the rotor 60 along its axis, as described. Upon rotation of the rotor 60 to force the cutter 44 into a cover hook 30, as recited, the angle of dive 54, FIG. 6, of the cutter 44 causes the cutter 44 to pull in a downward direction against the spring 108 as it rotates. The effect of this is to cause the cutter edge 46 to seek an optimum cutter hook severing position in relation to the reversely curved cutter guiding segment 38 of the cover hook. In this manner, the opener is capable of compensating for dimensional variations in the shaping of the cover hook to effect an optimum cover hook severing action, despite dimensional deviations of the cover hook from design specifications.

It may be noted that the outward swaging of an annular portion 128 of the chuck wall 34 as an incident to opening of the container, FIG. 8, serves to advantage in providing a yieldable retention of the cover on the can body if the cover is replaced to reclose the can.

The opener thus provided is well adapted for economical manufacture on a mass production basis.

It will be appreciated that the invention is not necessarily limited to the use of the particular construction illustrated but includes the use of variants and alternatives within the spirit and scope of the claims.

The invention is claimed as follows:

1. For opening a can having an axially projecting end seam, a can opener comprising a support member adapted to extend over the end of a can to be opened, a platen roller journalled on said support for engagement with the radially inward face of a can end seam, said support defining a bearing slot therein having a spacing from the axis of said roller which narrows in a predetermined direction of opener movement with respect to a coacting can, a rotor journalled in said slot and being slidable therein, a cutter on said rotor defining a circular cutting edge disposed in opposing spaced relation to said roller to engage a can end seam intervening between the cutter and said roller, means for rotating said rotor to effect movement of said opener in said predetermined direction with respect to a can, an abutment on said support, a cam connected with said rotor and coacting with said abutment to displace the rotor within said slot to move said cutter toward said roller as an incident to rotation of the rotor, and an end seam engaging rider disposed rearward of said cutter with respect to said direction of opener movement and being located with reference to said support in a predetermined position with repect to said cutter to effect a forward tipping of the axis of the cutter upon application of the opener to a can so that the cutter has a substantial angle of dive in said direction of opener movement.

[2. A can opener for opening a can by cutting through a cover hook which infolds a body hook in an axially projecting end seam of the can, said opener comprising a cutter defining a cutting edge adapted to engage the radially outside side of a can end seam, means for effecting movement of the cutter in a predetermined direction along a can end seam, means for forcing said cutter radially inward into engagement with a can end seam, and can engaging means for positioning said cutting edge in relation to a can end seam to have a substantial angle of dive in said predetermined direction of cutter movement.]

3. For opening a can having an axially projecting end seam in which a cover hook is folded around a body hook, a can opener comprising, in combination, a rotatable cutter and a platen element disposed in opposed spaced relation to each other to receive a can end seam therebetween, said cutter defining a circular cutting edge, means for effecting relative movement of said cutter and said platen element in relation to each other, to reduce the spacing between the platen element and the cutting edge on the cutter, a rider adapted to engage the axially outer edge of a container end seam interposed between said cutter and said platen element, said rider being connected with said cutter to occupy a position on the can side of the plane of said cutter edge in spaced relation to said plane to engage a can end seam interposed between said cutter and said platen element to cause the axis of the cutter to be tipped forwardly in the direction in which the opener moves around the can, and means for rotating said cutter.

4. For opening a can having an axially extending end seam in which a cover hook infolds a body hook, a can opener comprising, in combination, a support, a platen roller journalled on said support and adapted to engage the radially inward face of a can end seam, a rotary cutter defining a circular cutter edge, means journalling said cutter on said support to locate said cutter edge in opposed spaced relation to said roller, means for rotating said cutter, gears interconnecting said cutter with said roller to rotate the latter in synchronism with the cutter, means for effecting forced relative movement of said cutter and said roller toward each other to engage said cutter edge with a can end seam intervening between said cutter and said roller, and a rider connected with said support and position in relation to said cutter to ride on a can end seam extending between said cutter and said rotor to position the cutter with the axis thereof tipped forwardly in relation to the direction of movement of the opener with respect to a coacting can end seam.

5. A can opener adapted to open a can by cutting through a cover hook of the can and comprising, in combination, a support, a rotary cutter journaled on said support, said cutter defining a circular cutting edge, a platen element disposed in opposing relation to said cutter and adapted to engage the radially inward side of a container end seam, means for moving said cutter and said platen element in relation to each other to cause said cutting edge to approach said platen element to pierce the cover hook of a container end seam intervening between said cutter and platen element, means for rotating said cutter, a skid on said support adapted to engage a container end seam intervening between said cutter and platen element; said skid, with reference to a frame of reference in which the opener is positioned to open the upper end of a can disposed in an upright position, being disposed below the plane of said cutter edge to cause the axis of the cutter to be tipped downwardly in the direction in which the opener moves around the can; and a roller journalled on said support in coaxial relation to said cutter and being disposed with respect to said frame of reference below said cutter to engage the body of a container below the end seam of the container engaged by said cutter.

6. A can opener adapted to open a can by cutting through a cover hook of the can and comprising, in combination, a support adapted to overlie one end of a can to be opened, a rotary cutter journalled on said support and having a predetermined operating position in relation to said support, said cutter defining a sharp circular cutting edge, a platen element disposed in opposing relation to said cutter and adapted to engage the radially inward side of a container end seam, means for moving said cutter and platen element in relation to each other to cause said cutting edge to approach the platen element to pierce the cover hook of a container end seam intervening between said cutter and platen element, means for rotating said cutter, a skid on said support adapted to slidably engage a container end seam intervening between said cutter and platen element; said cutter, with reference to a frame of reference in which the opener is positioned to open the upper end of a can disposed in an upright position, being disposed below the plane of said cutter edge to cause the axis of the cutter to be tipped downwardly in the direction in which the opener moves around the can; a roller journalled on said support in coaxial relation to said cutter and extending with respect to said frame of reference downwardly to engage the body of a container below the end seam of the container engaged by said cutter, and said roller defining a container body engaging surface shaped in the general form of a cone having an apex angle of the order of thirty degrees.

7. A can opener adapted to open a can by cutting through a cover hook folded around a body hook in an axially projecting end seam of a can, said opener comprising, in combination, a support member adapted to extend across the axially outer edge of a can end seam, a platen roller journalled on said support member to engage the radially inward face of a can end seam, said platen roller including a radially projecting annular flange thereon adapted to engage the axially outer edge of a can end seam engaged along the inner face thereof by said platen roller, a rotary cutter defining a circular cutting edge, a journal supporting said cutter, said support defining a bearing slot therein having a spacing from the axis of said platen roller which decreases toward the leading end of the slot with respect to a predetermined direction in which the opener moves with respect to a can being opened, said journal being rotatably and slidably disposed in said slot to force said cutter toward said roller upon movement of said journal toward the leading end of the slot, said journal being supported in relation to said support to position said cutter axially so that the plane of said cutting edge is disposed inwardly of the most nearly adjacent arcuate portion of said roller flange, a handle on said support, hand operating means connected to rotate said cutter, driving gears interconnecting said cutter with said roller to rotate the latter, a can engaging rider on said support disposed rearwardly with respect to said direction of opener movement from a line extending between the axes of said cutter and said roller and being positioned to engage a can to position said cutter with the axis thereof in a forwardly tipped position with respect to said direction of opener movement when said roller flange is in engagement with the axially outer edge of a can end seam, a can body engaging roller rotatably supported on said support in coaxial relation to said cutter and being disposed axially inward of said cutting edge, and said body engaging roller having a generally conical shape, said body engaging roller having an apex of approximately thirty degrees and being positioned axially so that the radius of said cutter edge is somewhat less than the axial spacing of the cutter from the apex of the conical form of the body roller multiplied by the tangent of one-half of said apex angle.

8. For opening a can having an axially extending end seam in which a cover hook infolds a body hook, a can opener comprising, in combination, a support, a back-up element on said support adapted to engage the radially inwardly face of a can end seam, a rotary cutter defining a circular cutting edge, means journalling said cutter on said support to locate said cutting edge in opposed spaced relation to said back-up element, means for rotating said cutter, means for effecting forced relative movement of said cutter and said back-up element toward each other to engage said cutting edge with a can end seam intervening between said cutter and said element, and a rider connected with said support and positioned in relation to said cutter to ride on a can end seam extending between said cutter and said back-up element to position the cutter to have a substantial angle of dive with respect to the end seam engaged by the rider.

9. A can opener for opening a can by cutting through a cover hook which infolds a body hook in an axially projecting end seam of the can, said opener comprising a rotary cutter adapted to engage the radially outward side of a can end seam, means for rotating said cutter, *said* means *being operable in the same direction* for forcing said cutter radially inward into engagement with a can end seam, and means for positioning the cutter in relation to a can end seam to have an angle of dive of approximately six to eight degrees in a predetermined direction of opener movement relative to a coacting can.

10. A can opener adapted to open a can comprising a cover secured to a can body by an axially extending end seam in which a cover hook infolds a body hook, said opener comprising a cutter defining a cover hook cutting edge, a back-up element support means adapted to span a can end seam and supporting said cutter and said back-up element in opposed relation to each other to engage respectively the radially outward and the radially inward sides of an intervening can end seam, means for forcing relative movement of said cutter and said back-up element in relation to each other to cause said cutting edge to approach said back-up element and to force said cutting edge to cut through a cover hook in a can end seam intervening between the cutter and back-up element; means on said support means adapted to engage the end of a coacting can to position said cutter in relation to a can end seam so that a plane containing said cutting edge is tipped, with respect to the plane of the can end seam engaged by the cutter, downwardly at a substantial angle in a predetermined direction of cutter movement with respect to the can; and means for effecting movement of the opener around a can end seam in said predetermined direction.

11. A can opener for opening a can by cutting through the cover hook of an axially projecting can end seam in which a cover hook infolds a body hook, said opener comprising a rotary cutter defining a circular cutting edge, means for rotating the cutter to progress the opener around a container end seam in a predetermined direction, means for moving said cutting radially inward with respect to a can end seam to cut through a cover hook of the end seam, can engaging means for positioning said cutter in relation to an end seam so that the axis of the cutter is inclined outwardly with respect to the adjacent body of the coacting can, and can engaging means for positioning said cutter in relation to a can end seam so that the axis of the cutter is tipped forwardly in said direction of opener movement.

12. A can opener for opening a can by cutting through the cover hook of an axially projecting can end seam in which a cover hook infolds a body hook, said opener comprising a rotary cutter defining a circular cutting edge, means for rotating the cutter to progress the opener around a container end seam in a predetermined direction, means for moving said cutter radially inward with respect to a can end seam to cut through a cover hook of the end seam, can engaging means for positioning said cutter in relation to an end seam so that the axis of the cutter is inclined outwardly at an angle of approximately fifteen degrees with respect to the adjacent body of a coacting can, and can engaging means for positioning said cutter in relation to a can end seam so that the axis of the cutter is tipped forwardly at an angle of the order of six to eight degrees in said direction of opener movement.

13. For opening a can having an axially projecting end seam, a can opener comprising a support reinforced by a peripheral flange and being adapted to extend over the end of a can to be opened, a platen roller journalled on said support, said platen roller including a flange adapted to extend across the axially outer edge of a can end seam and defining a roller surface adapted to engage the inner face of an end seam, said support defining a kidney shaped bearing slot therein having a spacing from the axis of said roller which varies along said slot, a rotor journalled in said slot and being slidable therethrough, a cutter on said rotor defining a circular cutting edge disposed in opposing spaced relation to said roller to engage a can end seam intervening between the cutter and said roller, means for rotating said rotor, an abutment on said support, a cam connected with said rotor and coacting with said abutment to displace the rotor within said slot to move said cutter toward said roller as an incident to rotation of the rotor, gears connecting said rotor and said roller to rotate the latter, and a handle on said support.

14. A can opener adapted to open a can comprising a cover secured to a can body by an axially extending end seam in which a cover hook infolds a body hook, said opener comprising a rotary cutter defining a circular cutter edge, a back-up element, support means adapted to radially span a can end seam and supporting said cutter and said back-up element in opposed spaced relation to each other to engage respectively the radially outward and the radially inward sides of an intervening can end seam, means for rotating said cutter, means for forcing relative movement of said cutter and said back-up element toward each other to force the cutter edge to cut through a cover hook in an end seam intervening between the cutter and back-up element; and means on said support means adated to engage the end of a coacting can to position said cutter in relation to a can end seam so that the axis of the cutter is tipped forwardly, in the direction in which the opener moves with respect to a can, at an angle of the order of six to eight degrees with reference to a line extending through the center of the cutter edge in perpendicular relation to the plane of a can end seam engaged by the cutter.

15. A can opener adapted to open a can comprising a cover secured to a can body by an axially extending end seam in which a cover hook infolds a body hook, said opener comprising a rotary cutter defining a circular cutter edge, a back-up element, support means adapted to radially span a can end seam and supporting said cutter and said back-up element in opposed relation to each other to engage respectively the radially outward and the radially inward sides of an intervening can end seam, means for rotating said cutter means for forcing relative movement of said cutter and said back-up element toward each other to force the cutter edge to cut through a cover hook in an end seam intervening between the cutter and back-up element, means on said support means adapted to engage the end of a coacting can to position said cutter in relation to a can end seam so that the axis of the cutter is tipped forwardly approximately six to eight degrees with reference to a plane extending through the center of the cutter edge in perpendicular relation to the adjacent portion of a can end seam engaged by the cutter, and can engaging means on said support position to engage a coacting can to locate the cutter with the axis thereof tipped approximately fifteen degrees outwardly with respect to a longitudinal segment of the can body adjacent the cutter.

16. For opening a can having an axially extending end seam in which a cover hook infolds a body hook, a can opener comprising, in combination, a support, a platen element on said support adapted to engage the radially inward side of a can end seam, a rotary cutter defining a circular cutting edge, means journalling said cutter on said support to locate said cutter edge in opposed spaced relation to said platen element, said means journalling said cutter including means providing for limited floating movement of said cutter along the axis thereof, means biasing said cutter along the axis thereof toward a normal position of the cutter relative to said support, means for rotating said cutter, means for effecting forced relative movement of said cutter and said platen element in relation to each other to cause said cutting edge to approach said platen element and engage a can end seam intervening between said cutter and said platen element, and a rider connected with said support and positioned in relation to said cutter to ride on a can end seam extending between said cutter and said platen element to position said cutter to have a substantial angle of dive with respect to the end seam engaged by the rider.

17. A can opener for opening a can by cutting through a cover hook which infolds a body hook in an end seam of the can, said opener comprising a rotary cutter adapted to engage the radially outward side of a can end seam, means for rotating said cutter, support means for said cutter, means for forcing said cutter radially inward into engagement with a can end seam, means for positioning the cutter in relation to a can end seam to have a substantial angle of dive in a predetermined direction of opener movement relative to the can, and said support means for the cutter including means providing for limited floating movement of the cutter in a generally axial direction with respect to the axis of the cutter.

18. For opening a can having an axially extending end seam in which a cover hook infolds a body hook, a can opener comprising, in combination, a support, a rotary cutter defining a circular cutting edge, means journalling said cutter on said support, and means journalling said cutter including means providing for floating movement of said cutter in a generally axial direction with respect to the axis of the cutter, means for effecting rotation of said cutter, means for effecting forced movement of said cutter radially inward with respect to an adjacent can end seam to cause said cutting edge to cut through the cover hook of the end seam, and a rider connected with said support and positioned in relation to said cutter to ride on a can end seam engaged by said cutter to tip said cutter forward to have a substantial angle of dive.

19. A can opener adapted to open a can having a cover secured to a can body by an axially extending end seam in which the cover hook infolds a body hook, said opener comprising a cutter defining a cover hook cutting edge, a platen element, support means adapted to span a can end seam and supporting said cutter and said platen element in opposed relation to each other to engage respectively the radially outward and the radially inward sides of an intervening can end seam, said support means including means for providing for limited floating movement of said cutting edge in a generally axial direction with respect to a can end seam intervening between said platen element and said cutting edge, means for forcing relative movement of said cutter and said platen element toward each other to force said cutting edge to cut through a cover hook in an end seam intervening between the cutter and the platen element, means for effecting movement of the opener around a can end seam in a predetermined forward direction, and means on said support means adapted to engage the end of a coacting can to position said cutter in relation to a can end seam so that a plane containing said cutting edge is tipped inwardly and forwardly at a substantial angle with respect to the plane of the end seam engaged by the cutter.

20. For opening a can having an axially projecting end seam, a can opener comprising upper and lower supports rigidly connected together, a platen roller journalled on said upper support for engagement with the radially inward face of a can end seam, said upper and lower supports defining respectively two similarly shaped bearing slots therein alined with each other and individually having a spacing from the axis of said roller which narrows in a predetermined direction of opener movement with respect to a coacting can, a rotor journalled in both of said bearing slots and extending therebetween, a cutter on said rotor disposed between said supports and defining a circular cutting edge disposed in opposing spaced relation to said roller to engage a can end seam intervening between the cutter and said roller, means for rotating said rotor to effect movement of said opener in said predetermined direction with respect to a can, an abutment on one of said supports, a cam connected with said rotor and coacting with said abutment to displace the rotor within said slots to move said cutter toward said roller as an incident to rotation of the rotor, and an end seam engaging rider connected with said supports and disposed rearwardly of said cutter with respect to said direction of opener movement and being located with reference to said supports in a predetermined position with respect to said cutter to effect a forward tipping of the axis of the cutter, upon application of the opener to a can, so that the cutter has a substantial angle of dive in said direction of opener movement.

21. For opening a can having an axially projecting end seam, a can opener comprising upper and lower supports rigidly connected together, a platen element connected with said supports for engagement with the radially inward face of a can end seam, said upper and lower supports including means defining on the respective supports two bearings, a rotor journalled in said bearings and defining a circular cutting edge disposed in opposing spaced relation to said platen element to engage a can end seam intervening between the cutting edge and the platen element, means for effecting movement of the opener around a can end seam in a forward direction, means for moving relatively toward each other said platen element and said cutting edge, and means on said supports engageable with a can end seam intervening between said platen element and said cutting edge to effect a forward and inward tipping of the cutting edge to have a substantial angle of dive in a forward direction.

*22. A can opener for opening a can by cutting through a cover hook which infolds a body hook in an axially projecting end seam of the can, said opener comprising a cutter defining a cutting edge adapted to engage the radially outside of a can end seam, means for effecting movement of the cutter in a predetermined direction along a can end seam, means for forcing said cutter radially inward into engagement with a can end seam, and can engaging means laterally displaced from the cutter engageable with the axially projecting edge of the can end seam for positioning said cutting edge in relation to a can end seam to have a substantial angle of dive in said predetermined direction of cutter movement.*

*23. A can opener for opening a can by cutting through a cover hook which infolds a body hook in an axially projecting end seam of the can, said opener comprising a cutter defining a cutting edge adapted to engage the radially outside side of a can end seam, means for effecting movement of the cutter in a predetermined direction along a can end seam, positively acting means operated upon the initial movement of the cutter moving means for forcing said cutter radially inward into engagement with a can end seam, and can engaging means for positioning said cutting edge in relation to a can end seam to have a substantial angle of dive in said predetermined direction of cutter movement.*

*24. A can opener for opening a can by cutting through a cover hook which infolds a body hook in an axially projecting end seam of the can, said opener comprising a cutter defining a cutting edge adapted to engage the radially outside side of a can end seam, means for effecting movement of the cutter in a predetermined direction along a can end seam, positively acting cam means for forcing said cutter radially inward into engagement with a can*

*end seam, and can engaging means laterally displaced from the cutter for positioning said cutting edge in relation to a can end seam to have a substantial angle of dive in said predetermined direction of cutter movement.*

*25. A can opener for opening a can by cutting through a cover hook which infolds a body hook in an axially projecting end seam of the can, said opener comprising a cutter defining a cutting edge adapted to engage the radially outside side of a can end seam, means for effecting movement of the cutter in a predetermined direction along a can end seam, a cam operated upon the initial movement of the cutter moving means for forcing said cutter radially inward into engagement with a can end seam, and can engaging means for positioning said cutting edge in relation to a can end seam to have a substantial angle of dive in said predetermined direction of cutter movement.*

*26. For opening a can having an axially extending end seam in which a cover hook infolds a body hook, a can opener comprising, in combination, a support, a back-up element on said support adapted to engage the radially inwardly face of a can end seam, a rotary cutter defining a circular cutting edge, means journalling said cutter on said support to locate said cutting edge in opposed spaced relation to said back-up element, means for rotating said cutter, positively acting means for effecting forced relative movement of said cutter and said back-up element toward each other to engage said cutting edge with a can end seam intervening between said cutter and said element, and a rider connected with said support and positioned in relation to said cutter to ride on a can end seam extending between said cutter and said back-up element to position the cutter to have a substantial angle of dive with respect to the end seam engaged by the rider.*

*27. For opening a can having an axially extending end seam in which a cover hook infolds a body hook, a can opener comprising, in combination, a support, a back-up element on said support adapted to engage the radially inwardly face of a can end seam, a rotary cutter defining a circular cutting edge, means journalling said cutter on said support to locate said cutting edge in opposed spaced relation to said back-up element, means for rotating said cutter, positively acting cam means for effecting forced relative movement of said cutter and said back-up element toward each other to engage said cutting edge with a can end seam intervening between said cutter and said element, and a rider connected with said support and positioned in relation to said cutter to ride on a can end seam extending between said cutter and said back-up element to position the cutter to have a substantial angle of dive with respect to the end seam engaged by the rider.*

*28. For opening a can having an axially extending end seam in which a cover hook infolds a body hook, a can opener comprising, in combination, a support, a back-up element on said support adapted to engage the radially inwardly face of a can end seam, a rotary cutter defining a circular cutting edge, means journalling said cutter on said support to locate said cutting edge in opposed spaced relation to said back-up element, means for rotating said cutter, a cam operated upon the initial movement of the cutter rotating means for effecting forced relative movement of said cutter and said back-up element toward each other to engage said cutting edge with a can end seam intervening between said cutter and said element, and a rider connected with said support and positioned in relation to said cutter to ride on a can end seam extending between said cutter and said back-up element to position the cutter to have a substantial angle of dive with respect to the end seam engaged by the rider.*

*29. For opening a can having an axially extending end seam in which a cover hook infolds a body hook, a can opener comprising, in combination, a support, a back-up element on said support adapted to engage the radially inwardly face of a can end seam, a rotary cutter defining a circular cutting edge, means journalling said cutter on said support to locate said cutting edge in opposed spaced relation to said back-up element, means for rotating said cutter, means for effecting forced relative movement of said cutter and said back-up element toward each other to engage said cutting edge with a can end seam intervening between said cutter and said element, and a rider connected with said support and positioned in relation to said cutter to ride on the axially projecting edge of a can end seam extending between said cutter and said back-up element in offset trailing relation to said cutter to position the cutter to have a substantial angle of dive with respect to the end seam engaged by the rider.*

References Cited

The following references, cited by the Examiner, are of record in the patented file of this patent or the original patent.

UNITED STATES PATENTS 2,997,786 8/1961 Kean ..... 30—9

OTHELL M. SIMPSON, Primary Examiner